(12) United States Patent
Vamanan et al.

(10) Patent No.: US 8,489,851 B2
(45) Date of Patent: Jul. 16, 2013

(54) PROCESSING OF READ REQUESTS IN A MEMORY CONTROLLER USING PRE-FETCH MECHANISM

(75) Inventors: Balajee Vamanan, Bangalore (IN); Tukaram Methar, Bangalore (IN); Mrudula Kanuri, Bangalore (IN); Sreenivas Krishnan, Campbell, CA (US)

(73) Assignee: NVIDIA Corporation, Santa Clara, CA (US)

( * ) Notice: Subject to any disclaimer, the term of this patent is extended or adjusted under 35 U.S.C. 154(b) by 502 days.

(21) Appl. No.: 12/333,295

(22) Filed: Dec. 11, 2008

(65) Prior Publication Data
US 2010/0153661 A1 Jun. 17, 2010

(51) Int. Cl.
*G06F 12/00* (2006.01)

(52) U.S. Cl.
USPC ........... 711/202; 711/105; 711/118; 711/137; 711/204

(58) Field of Classification Search
None
See application file for complete search history.

(56) References Cited

U.S. PATENT DOCUMENTS

| | | | |
|---|---|---|---|
| 3,091,657 A | 5/1963 | Stuessel | |
| 3,614,740 A | 10/1971 | Delagi et al. | |
| 3,987,291 A | 10/1976 | Gooding et al. | |
| 4,101,960 A | 7/1978 | Stokes et al. | |
| 4,541,046 A | 9/1985 | Nagashima et al. | |
| 4,566,005 A | 1/1986 | Apperley et al. | |
| 4,748,585 A | 5/1988 | Chiarulli et al. | |
| 4,897,717 A | 1/1990 | Hamilton et al. | |
| 4,958,303 A | 9/1990 | Assarpour et al. | |
| 4,965,716 A | 10/1990 | Sweeney | |
| 4,965,751 A | 10/1990 | Thayer et al. | |
| 4,985,848 A | 1/1991 | Pfeiffer et al. | |
| 5,040,109 A | 8/1991 | Bowhill et al. | |
| 5,047,975 A | 9/1991 | Patti et al. | |
| 5,175,828 A | 12/1992 | Hall et al. | |
| 5,179,530 A | 1/1993 | Genusov et al. | |
| 5,197,130 A | 3/1993 | Chen et al. | |
| 5,210,834 A | 5/1993 | Zurawski et al. | |
| 5,263,136 A | 11/1993 | DeAguiar et al. | |
| 5,327,369 A | 7/1994 | Ashkenazi | |
| 5,357,623 A | 10/1994 | Megory-Cohen | |
| 5,375,223 A | 12/1994 | Meyers et al. | |
| 5,388,206 A | 2/1995 | Poulton et al. | |

(Continued)

FOREIGN PATENT DOCUMENTS

| | | |
|---|---|---|
| DE | 29606102 | 6/1996 |
| JP | 07-101885 | 4/1995 |

(Continued)

OTHER PUBLICATIONS

Merriam-Webster Dictionary Online; Definition for "program"; retrieved Dec. 14, 2010.

(Continued)

*Primary Examiner* — Shawn X Gu

(57) ABSTRACT

A memory controller provided according to an aspect of the present invention includes a predictor block which predicts future read requests after converting the memory address in a prior read request received from the processor to an address space consistent with the implementation of a memory unit. According to another aspect of the present invention, the predicted requests are granted access to a memory unit only when there are no requests pending from processors and the peripherals sending access requests to the memory unit.

21 Claims, 3 Drawing Sheets

U.S. PATENT DOCUMENTS

| | | | |
|---|---|---|---|
| 5,388,245 A | 2/1995 | Wong | |
| 5,418,973 A | 5/1995 | Ellis et al. | |
| 5,430,841 A | 7/1995 | Tannenbaum et al. | |
| 5,430,884 A | 7/1995 | Beard et al. | |
| 5,432,905 A | 7/1995 | Hsieh et al. | |
| 5,517,666 A | 5/1996 | Ohtani et al. | |
| 5,522,080 A | 5/1996 | Harney | |
| 5,560,030 A | 9/1996 | Guttag et al. | |
| 5,561,808 A | 10/1996 | Kuma et al. | |
| 5,574,944 A | 11/1996 | Stager | |
| 5,627,988 A | 5/1997 | Oldfield | |
| 5,644,753 A | 7/1997 | Ebrahim et al. | |
| 5,649,173 A | 7/1997 | Lentz | |
| 5,666,169 A | 9/1997 | Ohki et al. | |
| 5,682,552 A | 10/1997 | Kuboki et al. | |
| 5,682,554 A | 10/1997 | Harrell | |
| 5,706,478 A | 1/1998 | Dye | |
| 5,754,191 A | 5/1998 | Mills et al. | |
| 5,761,476 A | 6/1998 | Martell | |
| 5,764,243 A | 6/1998 | Baldwin | |
| 5,784,590 A | 7/1998 | Cohen et al. | |
| 5,784,640 A | 7/1998 | Asghar et al. | |
| 5,796,974 A | 8/1998 | Goddard et al. | |
| 5,802,574 A | 9/1998 | Atallah et al. | |
| 5,809,524 A | 9/1998 | Singh et al. | |
| 5,812,147 A | 9/1998 | Van Hook et al. | |
| 5,835,788 A | 11/1998 | Blumer et al. | |
| 5,848,254 A * | 12/1998 | Hagersten | 712/207 |
| 5,920,352 A | 7/1999 | Inoue | |
| 5,925,124 A | 7/1999 | Hilgendorf et al. | |
| 5,940,090 A | 8/1999 | Wilde | |
| 5,940,858 A | 8/1999 | Green | |
| 5,949,410 A | 9/1999 | Fung | |
| 5,950,012 A | 9/1999 | Shiell et al. | |
| 5,978,838 A | 11/1999 | Mohamed et al. | |
| 5,999,199 A | 12/1999 | Larson | |
| 6,009,454 A | 12/1999 | Dummermuth | |
| 6,016,474 A | 1/2000 | Kim et al. | |
| 6,041,399 A | 3/2000 | Terada et al. | |
| 6,049,672 A | 4/2000 | Shiell et al. | |
| 6,073,158 A | 6/2000 | Nally et al. | |
| 6,092,094 A | 7/2000 | Ireton | |
| 6,108,766 A | 8/2000 | Hahn et al. | |
| 6,112,019 A | 8/2000 | Chamdani et al. | |
| 6,131,152 A | 10/2000 | Ang et al. | |
| 6,141,740 A | 10/2000 | Mahalingaiah et al. | |
| 6,144,392 A | 11/2000 | Rogers | |
| 6,150,610 A | 11/2000 | Sutton | |
| 6,189,068 B1 | 2/2001 | Witt et al. | |
| 6,192,073 B1 | 2/2001 | Reader et al. | |
| 6,192,458 B1 | 2/2001 | Arimilli et al. | |
| 6,208,361 B1 | 3/2001 | Gossett | |
| 6,209,078 B1 | 3/2001 | Chiang et al. | |
| 6,222,552 B1 | 4/2001 | Haas et al. | |
| 6,230,254 B1 | 4/2001 | Senter et al. | |
| 6,239,810 B1 | 5/2001 | Van Hook et al. | |
| 6,247,094 B1 | 6/2001 | Kumar et al. | |
| 6,252,610 B1 | 6/2001 | Hussain | |
| 6,292,886 B1 | 9/2001 | Makineni et al. | |
| 6,301,600 B1 | 10/2001 | Petro et al. | |
| 6,314,493 B1 | 11/2001 | Luick | |
| 6,317,819 B1 | 11/2001 | Morton | |
| 6,351,808 B1 | 2/2002 | Joy et al. | |
| 6,370,617 B1 | 4/2002 | Lu et al. | |
| 6,437,789 B1 | 8/2002 | Tidwell et al. | |
| 6,438,664 B1 | 8/2002 | McGrath et al. | |
| 6,480,927 B1 | 11/2002 | Bauman | |
| 6,490,654 B2 | 12/2002 | Wickeraad et al. | |
| 6,496,902 B1 | 12/2002 | Faanes et al. | |
| 6,499,090 B1 | 12/2002 | Hill et al. | |
| 6,525,737 B1 | 2/2003 | Duluk, Jr. et al. | |
| 6,529,201 B1 | 3/2003 | Ault et al. | |
| 6,597,357 B1 | 7/2003 | Thomas | |
| 6,603,481 B1 | 8/2003 | Kawai et al. | |
| 6,624,818 B1 | 9/2003 | Mantor et al. | |
| 6,629,188 B1 | 9/2003 | Minkin et al. | |
| 6,631,423 B1 | 10/2003 | Brown et al. | |
| 6,631,463 B1 | 10/2003 | Floyd et al. | |
| 6,657,635 B1 | 12/2003 | Hutchins et al. | |
| 6,658,447 B2 | 12/2003 | Cota-Robles | |
| 6,674,841 B1 | 1/2004 | Johns et al. | |
| 6,700,588 B1 | 3/2004 | MacInnis et al. | |
| 6,715,035 B1 | 3/2004 | Colglazier et al. | |
| 6,732,242 B2 | 5/2004 | Hill et al. | |
| 6,809,732 B2 | 10/2004 | Zatz et al. | |
| 6,812,929 B2 | 11/2004 | Lavelle et al. | |
| 6,825,843 B2 | 11/2004 | Allen et al. | |
| 6,825,848 B1 | 11/2004 | Fu et al. | |
| 6,839,062 B2 | 1/2005 | Aronson et al. | |
| 6,862,027 B2 | 3/2005 | Andrews et al. | |
| 6,891,543 B2 | 5/2005 | Wyatt | |
| 6,915,385 B1 | 7/2005 | Leasure et al. | |
| 6,944,744 B2 | 9/2005 | Ahmed et al. | |
| 6,952,214 B2 | 10/2005 | Naegle et al. | |
| 6,965,982 B2 | 11/2005 | Nemawarkar | |
| 6,975,324 B1 | 12/2005 | Valmiki et al. | |
| 6,976,126 B2 | 12/2005 | Clegg et al. | |
| 6,978,149 B1 | 12/2005 | Morelli et al. | |
| 6,978,457 B1 | 12/2005 | Johl et al. | |
| 6,981,106 B1 | 12/2005 | Bauman et al. | |
| 6,985,151 B1 | 1/2006 | Bastos et al. | |
| 7,015,909 B1 | 3/2006 | Morgan, III et al. | |
| 7,031,330 B1 | 4/2006 | Bianchini, Jr. | |
| 7,032,097 B2 | 4/2006 | Alexander et al. | |
| 7,035,979 B2 | 4/2006 | Azevedo et al. | |
| 7,148,888 B2 | 12/2006 | Huang | |
| 7,151,544 B2 | 12/2006 | Emberling | |
| 7,154,500 B2 | 12/2006 | Heng et al. | |
| 7,159,212 B2 | 1/2007 | Schenk et al. | |
| 7,185,178 B1 | 2/2007 | Barreh et al. | |
| 7,202,872 B2 | 4/2007 | Paltashev et al. | |
| 7,260,677 B1 | 8/2007 | Vartti et al. | |
| 7,305,540 B1 | 12/2007 | Trivedi et al. | |
| 7,321,787 B2 | 1/2008 | Kim | |
| 7,334,110 B1 | 2/2008 | Faanes et al. | |
| 7,369,815 B2 | 5/2008 | Kang et al. | |
| 7,373,478 B2 * | 5/2008 | Yamazaki | 711/205 |
| 7,406,698 B2 | 7/2008 | Richardson | |
| 7,412,570 B2 | 8/2008 | Moll et al. | |
| 7,486,290 B1 | 2/2009 | Kilgariff et al. | |
| 7,487,305 B2 | 2/2009 | Hill et al. | |
| 7,493,452 B2 * | 2/2009 | Eichenberger et al. | 711/137 |
| 7,545,381 B2 | 6/2009 | Huang et al. | |
| 7,564,460 B2 | 7/2009 | Boland et al. | |
| 7,750,913 B1 | 7/2010 | Parenteau et al. | |
| 7,777,748 B2 | 8/2010 | Bakalash et al. | |
| 7,852,341 B1 | 12/2010 | Rouet et al. | |
| 7,869,835 B1 | 1/2011 | Zu | |
| 8,020,169 B2 | 9/2011 | Yamasaki | |
| 2001/0026647 A1 | 10/2001 | Morita | |
| 2002/0116595 A1 | 8/2002 | Morton | |
| 2002/0130874 A1 | 9/2002 | Baldwin | |
| 2002/0144061 A1 | 10/2002 | Faanes et al. | |
| 2002/0194430 A1 | 12/2002 | Cho | |
| 2003/0001847 A1 | 1/2003 | Doyle et al. | |
| 2003/0003943 A1 | 1/2003 | Bajikar | |
| 2003/0014457 A1 | 1/2003 | Desai et al. | |
| 2003/0016217 A1 | 1/2003 | Vlachos et al. | |
| 2003/0016844 A1 | 1/2003 | Numaoka | |
| 2003/0031258 A1 | 2/2003 | Wang et al. | |
| 2003/0067473 A1 | 4/2003 | Taylor et al. | |
| 2003/0172326 A1 | 9/2003 | Coffin, III et al. | |
| 2003/0188118 A1 | 10/2003 | Jackson | |
| 2003/0204673 A1 | 10/2003 | Venkumahanti et al. | |
| 2003/0204680 A1 | 10/2003 | Hardage, Jr. | |
| 2003/0227461 A1 | 12/2003 | Hux et al. | |
| 2004/0012597 A1 | 1/2004 | Zatz et al. | |
| 2004/0073771 A1 | 4/2004 | Chen et al. | |
| 2004/0073773 A1 | 4/2004 | Demjanenko | |
| 2004/0103253 A1 | 5/2004 | Kamei et al. | |
| 2004/0193837 A1 | 9/2004 | Devaney et al. | |
| 2004/0205326 A1 | 10/2004 | Sindagi et al. | |
| 2004/0212730 A1 | 10/2004 | MacInnis et al. | |
| 2004/0215887 A1 | 10/2004 | Starke | |
| 2004/0221117 A1 | 11/2004 | Shelor | |
| 2004/0263519 A1 | 12/2004 | Andrews et al. | |
| 2005/0012759 A1 | 1/2005 | Valmiki et al. | |

| | | | |
|---|---|---|---|
| 2005/0024369 A1 | 2/2005 | Xie | |
| 2005/0071722 A1 | 3/2005 | Biles | |
| 2005/0088448 A1 | 4/2005 | Hussain et al. | |
| 2005/0239518 A1 | 10/2005 | D'Agostino et al. | |
| 2005/0262332 A1 | 11/2005 | Rappoport et al. | |
| 2005/0280652 A1 | 12/2005 | Hutchins et al. | |
| 2006/0020843 A1 | 1/2006 | Frodsham et al. | |
| 2006/0064517 A1 | 3/2006 | Oliver | |
| 2006/0064547 A1 | 3/2006 | Kottapalli et al. | |
| 2006/0103659 A1 | 5/2006 | Karandikar et al. | |
| 2006/0152519 A1 | 7/2006 | Hutchins et al. | |
| 2006/0152520 A1 | 7/2006 | Gadre et al. | |
| 2006/0176308 A1 | 8/2006 | Karandikar et al. | |
| 2006/0176309 A1 | 8/2006 | Gadre et al. | |
| 2007/0076010 A1 | 4/2007 | Swamy et al. | |
| 2007/0130444 A1 | 6/2007 | Mitu et al. | |
| 2007/0285427 A1 | 12/2007 | Morein et al. | |
| 2008/0016327 A1 | 1/2008 | Menon et al. | |
| 2008/0278509 A1 | 11/2008 | Washizu et al. | |
| 2009/0235051 A1 | 9/2009 | Codrescu et al. | |
| 2012/0023149 A1 | 1/2012 | Kinsman et al. | |

FOREIGN PATENT DOCUMENTS

| | | |
|---|---|---|
| JP | H08-077347 | 3/1996 |
| JP | H08-153032 | 6/1996 |
| JP | 08-297605 | 12/1996 |
| JP | 09-287217 | 11/1997 |
| JP | H09-325759 | 12/1997 |
| JP | 10-222476 | 8/1998 |
| JP | 11-190447 | 7/1999 |
| JP | 2000-148695 | 5/2000 |
| JP | 2001-022638 | 1/2001 |
| JP | 2003-178294 | 6/2003 |
| JP | 2004-252990 | 9/2004 |
| KR | 1998-018215 | 8/2000 |
| KR | 100262453 | 8/2000 |
| TW | 413766 | 12/2000 |
| TW | 436710 | 5/2001 |
| TW | 442734 | 6/2001 |

OTHER PUBLICATIONS

Gadre, S., Patent Application Entitled "Video Processor Having Scalar and Vector Components with Command FIFO for Passing Function Calls from Scalar to Vector", U.S. Appl. No. 11/267,700, filed Nov. 4, 2005.
Gadre, S., Patent Application Entitled "Stream Processing in a Video Processor", U.S. Appl. No. 11/267,599, filed Nov. 4, 2005.
Karandikar et al., Patent Application Entitled: "Multidemnsional Datapath Processing in a Video Processor", U.S. Appl. No. 11/267,638, filed Nov. 4, 2005.
Karandikar et al., Patent Application Entitled: "A Latency Tolerant System for Executing Video Processing Operations", U.S. Appl. No. 11/267,875, filed Nov. 4, 2005.
Gadre, S., Patent Application Entitled "Separately Schedulable Condition Codes for a Video Processor", U.S. Appl. No. 11/267,793, filed Nov. 4, 2005.
Lew, et al., Patent Application Entitled "A Programmable DMA Engine for Implementing Memory Transfers for a Video Processor", U.S. Appl. No. 11/267,777, filed Nov. 4, 2005.
Karandikar et al., Patent Application Entitled: "A Pipelined L2 Cache for Memory Transfers for a Video Processor", U.S. Appl. No. 11/267,606, filed Nov. 4, 2005.
Karandikar, et al., Patent Application Entitled: "Command Acceleration in a Video Processor", U.S. Appl. No. 11/267,640, filed Nov. 4, 2005.
Karandikar, et al., Patent Application Entitled "A Configurable SIMD Engine in a Video Processor", U.S. Appl. No. 11/267,393, filed Nov. 4, 2005.
Karandikar, et al., Patent Application Entitled "Context Switching on a Video Processor Having a Scalar Execution Unit and a Vector Execution Unit", U.S. Appl. No. 11/267,778, filed Nov. 4, 2005.
Lew, et al., Patent Application Entitled "Multi Context Execution on a Video Processor", U.S. Appl. No. 11/267,780, filed Nov. 4, 2005.
Su, Z, et al., Patent Application Entitled: "State Machine Control for a Pipelined L2 Cache to Implement Memory Transfers for a Video Processor", U.S. Appl. No. 11/267,119, filed Nov. 4, 2005.

Kozyrakis, "A Media enhanced vector architecture for embedded memory systems," Jul. 1999, http://digitalassets.lib.berkeley.edu/techreports/ucb/text/CSD-99-1059.pdf.
HPL-PD A Parameterized Research Approach—May 31, 2004 http://web.archive.org/webr/*/www.trimaran.org/docs/5_hpl-pd.pdf.
Hutchins E., SC10: A Video Processor And Pixel-Shading GPU for Handheld Devices; presented at the Hot Chips conferences on Aug. 23rd, 2004.
Wilson D., NVIDIA's Tiny 90nm G71 and G73: GeForce 7900 and 7600 Debut; at http://www.anandtech.com/show/1967/2; dated Sep. 3, 2006, retrieved Jun. 16, 2011.
Woods J., Nvidia GeForce Fx Preview, at http://www.tweak3d.net/reviews/nvidia/nv30preview/1.shtml; dated Nov. 18, 2002; retrieved Jun. 16, 2011.
NVIDIA Corporation, Technical Brief: Transform and Lighting; dated 1999; month unknown.
Heirich; Optimal Automatic Mulit-pass Shader Partitioning by Dynamic Programming; Eurographics—Graphics Hardware (2005); Jul. 2005.
Brown, Brian; "Data Structure And Number Systems"; 2000; http://www.ibilce.unesp.br/courseware/datas/data3.htm.
Intel, Intel Architecture Software Deveopler's Manual, vol. 1: Basic Architecture 1997 p. 8-1.
Intel, Intel Architecture Software Deveopler's Manual, vol. 1: Basic Architecture 1999 p. 8-1, 9-1.
Intel, Intel Pentium III Xeon Processor at 500 and 550Mhz, Feb. 1999.
Free On-Line Dictionary of Computing (FOLDOC), defintion of "video", from foldoc.org/index.cgi? query=video&action=Search, May 23, 2008.
FOLDOC, definition of "frame buffer", from foldoc.org/index.cgi?query=frame+buffer&action=Search, Oct. 3, 1997.
PCreview, article entitled "What is a Motherboard", from www.pcreview.co.uk/articles/Hardware/What_is_a_Motherboard., Nov. 22, 2005.
FOLDOC, definition of "motherboard", from foldoc.org/index.cgi?query=motherboard&action=Search, Aug. 10, 2000.
FOLDOC, definition of "separate compilation", from foldoc.orglindex.cgi?query=separate+compilation&action=Search, Feb. 19, 2005.
FOLDOC, definition of "vector processor", http://foldoc.org/, Sep. 11, 2003.
Wikipedia, defintion of "vector processor", http://en.wikipedia.org/, May 14, 2007.
Fisher, Joseph A., Very Long Instruction Word Architecture and the ELI-512, ACM, 1993, pp. 140-150.
FOLDOC (Free On-Line Dictionary of Computing), defintion of X86, Feb. 27, 2004.
FOLDOC, definition of "superscalar," http://foldoc.org/, Jun. 22, 2009.
FOLDOC, definition of Pentium, Sep. 30, 2003.
Wikipedia, definition of "scalar processor," Apr. 4, 2009.
Intel, Intel MMX Technology at a Glance, Jun. 1997.
Intel, Pentium Processor Family Developer's Manual, 1997, pp. 2-13.
Intel, Pentium processor with MMX Technology at 233Mhz Performance Brief, Jan. 1998, pp. 3 and 8.
Wikipedia, entry page defining term "SIMD", last modified Mar. 17, 2007.
FOLDOC, Free Online Dictionary of Computing, defintion of SIMD, foldoc.org/index.cgi?query=simd&action=Search, Nov. 4, 1994.
Definition of "queue" from Free on-Line Dictionary of Computing (FOLDOC), http://foldoc.org/index.cgi? query=queue&action=Search, May 15, 2007.
Definition of "first-in first-out" from FOLDOC, http://foldoc.org/index.cgi?query=fifo&action=Search, Dec. 6, 1999.
Definition of "block" from FOLDOC, http://foldoc.org/index.cgi?block, Sep. 23, 2004.
Quinnell, Richard A. "New DSP Architectures Go "Post-Harvard" for Higher Performance and Flexibility" Techonline; posted May 1, 2002.

Wikipedia, definition of Multiplication, accessed from en.wikipedia.org/w/index.php?title=Multiplication&oldid=1890974, published Oct. 13, 2003.

IBM TDB, Device Queue Management, vol. 31 Iss. 10, pp. 45-50, Mar. 1, 1989.

Hamacher, V. Carl et al., Computer Organization, Second Edition, McGraw Hill, 1984, pp. 1-9.

Graham, Susan L. et al., Getting Up to Speed: The future of Supercomputing, the National Academies Press, 2005, glossary.

Rosenberg, Jerry M., Dictionary of Computers, Information Processing & Telecommunications, 2nd Edition, John Wiley & Sons, 1987, pp. 102 and 338.

Rosenberg, Jerry M., Dictionary of Computers, Information Processing & Telecommunications, 2nd Edition, John Wiley & Sons, 1987, pp. 305.

Graf, Rudolf F., Modern Dictionary of Electronics, Howard W. Sams & Company, 1988, pp. 273.

Graf, Rudolf F., Modern Dictionary of Electronics, Howard W. Sams & Company, 1984, pp. 566.

Wikipeida, definition of "subroutine", published Nov. 29, 2003, four pages.

Graston et al. (Software Pipelining Irregular Loops on the TMS320C6000 VLIW DSP Architecture); Proceedings of the ACM SIGPLAN workshop on Languages, compilers and tools for embedded systems; pp. 138-144; Year of Publication: 2001.

SearchStorage.com Definitions, "Pipeline Burst Cache," 31 Jul 2001, url: http://searchstorage.techtarget.com/sDefinition/0,,sid5_gci214414,00.html.

Parhami, Behrooz, Computer Arithmetic: Algorithms and Hardware Designs, Oxford University Press, Jun. 2000, pp. 413-418.

gDEBugger, graphicRemedy, http://www.gremedy.com, Aug. 8, 2006.

Duca et al., A Relational Debugging Engine for Graphics Pipeline, International Conference on Computer Graphics and Interactive Techniques, ACM SIGGRAPH 2005, pp. 453-463, ISSN:0730-0301.

"Vertex Fog"; http://msdn.microsoft.com/library/en-us/direcb(9_cNertex_fog.asp?frame=true Mar. 27, 2006 (P001264).

"Anti-aliasing"; http://en.wikipedia.org/wiki/Anti-aliasing; Mar. 27, 2006 (P001264).

"Alpha Testing State"; http://msdn.microsoft.com/libraty/en-usidirectx9_c/directx/graphics/programmingguide/GettingStarted/Direct3Kdevices/States/renderstates/alphatestingstate.asp Mar. 25, 2005 (P001264).

Defintion of "Slot," http://www.thefreedictionary.com/slot, Oct. 2, 2012.

Espasa R et al: "Decoupled vector architectures", High-Performance Computer Architecture, 1996. Proceedings., Second International Symposium on San Jose, CA, USA Feb. 3-7, 1996, Los Alamitos, CA, USA, IEEE Comput. Soc, US, Feb. 3, 1996, pp. 281-290, XPO1 0162067, DOI: 10.11 09/HPCA.1996.501193 ISBN: 978-0-8186-7237-8.

* cited by examiner

PROCESSING OF READ REQUESTS IN A MEMORY CONTROLLER USING PRE-FETCH MECHANISM

BACKGROUND OF THE INVENTION

1. Technical Field

The present disclosure relates to memory controllers, and more specifically to processing of read requests in a memory controller using pre-fetch mechanism.

2. Related Art

A memory controller refers to a component which receives access requests (read requests, write requests, etc.) directed to a memory (e.g., DRAM), and forwards the access requests to the memory. In case of read requests, the memory controller may receive the retrieved data as a response and forwards the retrieved data to components (requesters) from which the read request is received.

In a typical configuration, multiple requesters (such as a central processing unit, graphics controller, external peripherals, etc.) send access requests on a bus and receive corresponding responses also on the bus.

Memory controllers often rely on pre-fetch mechanism in processing read requests. Pre-fetch generally refers to retrieval of data, which is not specifically requested in presently being processed read requests. In general, pre-fetching is performed with a view to immediately providing response to any later received read requests, which request the pre-fetched data.

Thus, a cache is often used to store pre-fetched data and the cache is examined for matching data and if a match is found, the data from the cache is immediately sent to the requester. As a result, responses to such read requests (when match is found) may be provided with reduced delay/latency.

It is generally desirable that such pre-fetch mechanism be supported with one or more of requirements such as reduced latency for at least some types of read requests, avoidance of delay for other requesters, etc.

SUMMARY

A memory controller provided according to an aspect of the present invention includes a predictor block, which predicts future read requests after converting the memory address in a prior read request to an address space consistent with the implementation of a memory unit. In an embodiment, such a feature enables reduction of latency in forming the predicted requests.

According to another aspect of the present invention, the predicted requests are granted access to a memory unit only when there are no requests pending from processors and the peripherals sending access requests to the memory unit. As a result, the non-predicted (actual) read requests (received from processors, peripherals, etc.) may be forwarded to memory unit with less delays.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

BRIEF DESCRIPTION OF THE DRAWINGS

Example embodiments of the present invention will be described with reference to the accompanying drawings briefly described below.

DESCRIPTION OF EXAMPLE EMBODIMENTS

Example Environment

Figure 1:
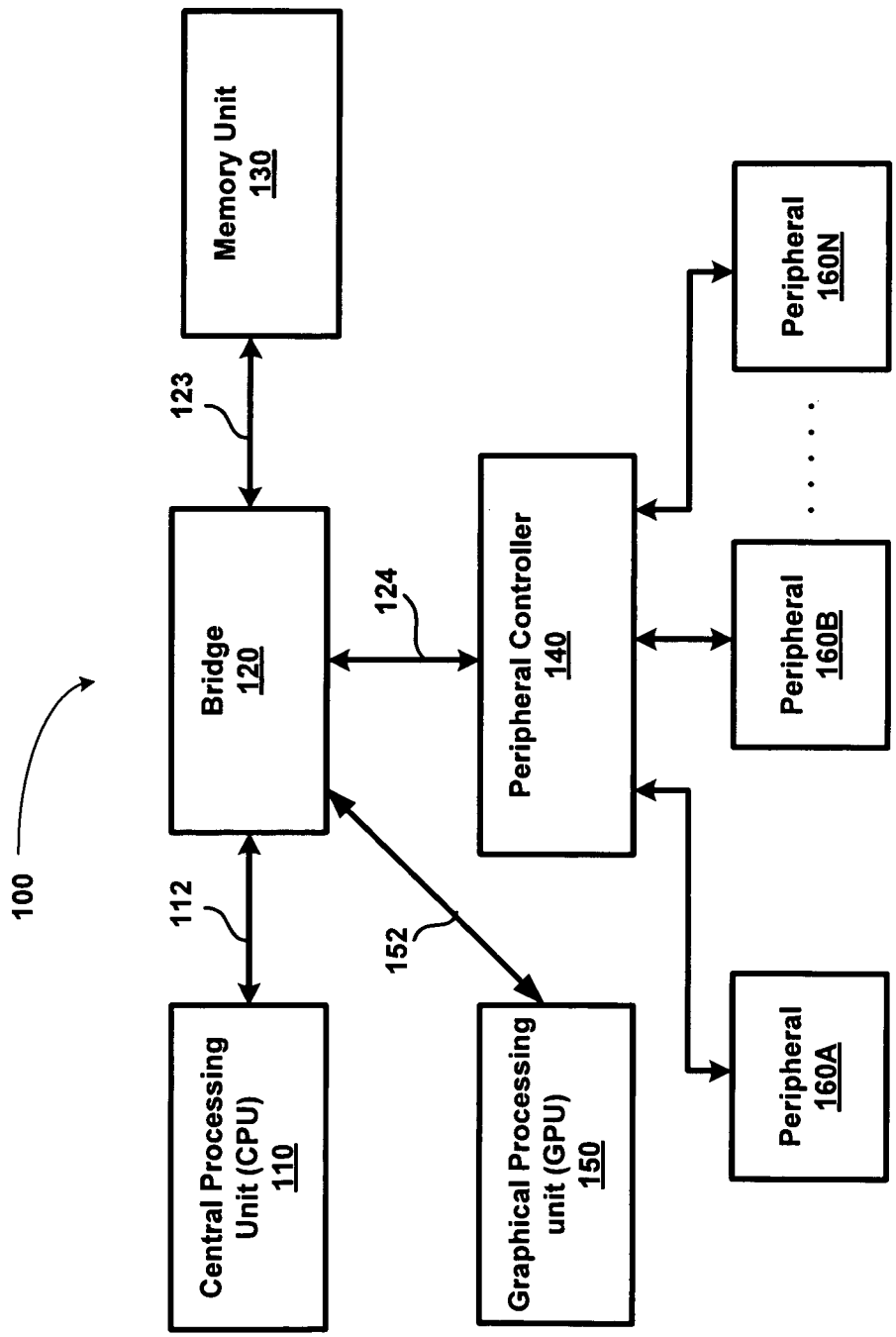
FIG. 1 is a block diagram illustrating the details of an example system/device in which several aspects of the present invention can be implemented.

FIG. 1 is a block diagram of an example environment in which several aspects of the present invention can be implemented. The diagram is shown merely for the purpose of illustration, and alternative embodiments may include other blocks and different interconnections between the blocks. System 100 is shown containing central processing unit (CPU) 110, bridge 120, memory unit 130, peripheral controller 140, graphical processing unit (GPU) 150, and peripherals 160A through 160N.

Memory unit 130 represents a memory to which access requests are sent by various requesters (CPU 110, peripheral controller 140 and GPU 150). In general, the access requests need to be sent consistent with an addressing mechanism implemented within memory unit 130. In one embodiment described below in further details, memory unit 130 is implemented as a DIMM (dual-in-line memory module), which requires addresses to be specified in a row-column bank format. For further details of addressing employed in DIMM and other details, the reader is referred to JEDEC DDR3 Specification.

CPU 110 executes instructions stored in memory unit 130 (retrieved via path 112), to implement various user applications and other system software (e.g., drivers, operating system) shared by the user applications. CPU 110 may also store and retrieve data from memory unit 130 while executing such instructions. As relevant to various features of the present invention, CPU 110 sends read requests on bus 112 and receives the corresponding data also on path 112.

GPU 150 generates display signals representing image frames based on various data and commands received from CPU 110. In general, the received data (retrieved via path 152) is processed according to the commands to generate image frames, and display signals are generated corresponding to the image frames. GPU 150 also may send access requests to memory unit 130 via bridge 120 (on path 152). In general, GPU and CPU represent example processor units, which send access requests to memory unit 130.

Peripheral controller 140 provides interface using protocols such as I2C and SATA, to enable multiple lower "intelligence" devices (160A-160N) to interact with other components of system 100. Each peripheral 160A-160N sends access requests through peripheral controller 140 to bridge 120 via path 124. Peripheral controller 140 on receiving the retrieved data in case of read request (on path 124) locates the peripherals, which requested the data and sends the data to the corresponding peripherals.

In an embodiment, peripheral controller 140 corresponds to "South Bridge" and bridge 120 corresponds to "North Bridge", well known in the relevant arts. Peripherals 160A-160N can be one of SATA (transfer of data between the motherboard and storage devices, such as hard disk drives, inside a computer) or USB (NAND-type flash memory data storage device) compatible devices, audio codec (a hardware device or a computer program that compresses/decompresses digital audio data) or any other device/interface as may be required for the specific environment as is well known in relevant arts.

Bridge 120, provided according to various aspects of the present invention, receives access requests from the various requesters and interfaces with memory unit 130 to ensure that the requests are processed. Accordingly, bridge is deemed to contain a memory controller in accordance with several aspects of the present invention. The requests are received consistent with the interface requirements of respective buses 112/124/152 and implementation of requesters. In addition, the access requests are directed to the memory unit in that the source of the memory request indicates that the access requests are to be forwarded to memory unit 130 by an appropriate convention (and thus, the access requests are said to be directed to memory unit 130).

Various aspects of the present invention enable memory controller to efficiently use pre-fetch mechanism. The features will be clearer in comparison with a prior implementation. Accordingly the description is first continued with respect to a prior implementation.

Example Prior Approach

Figure 2:
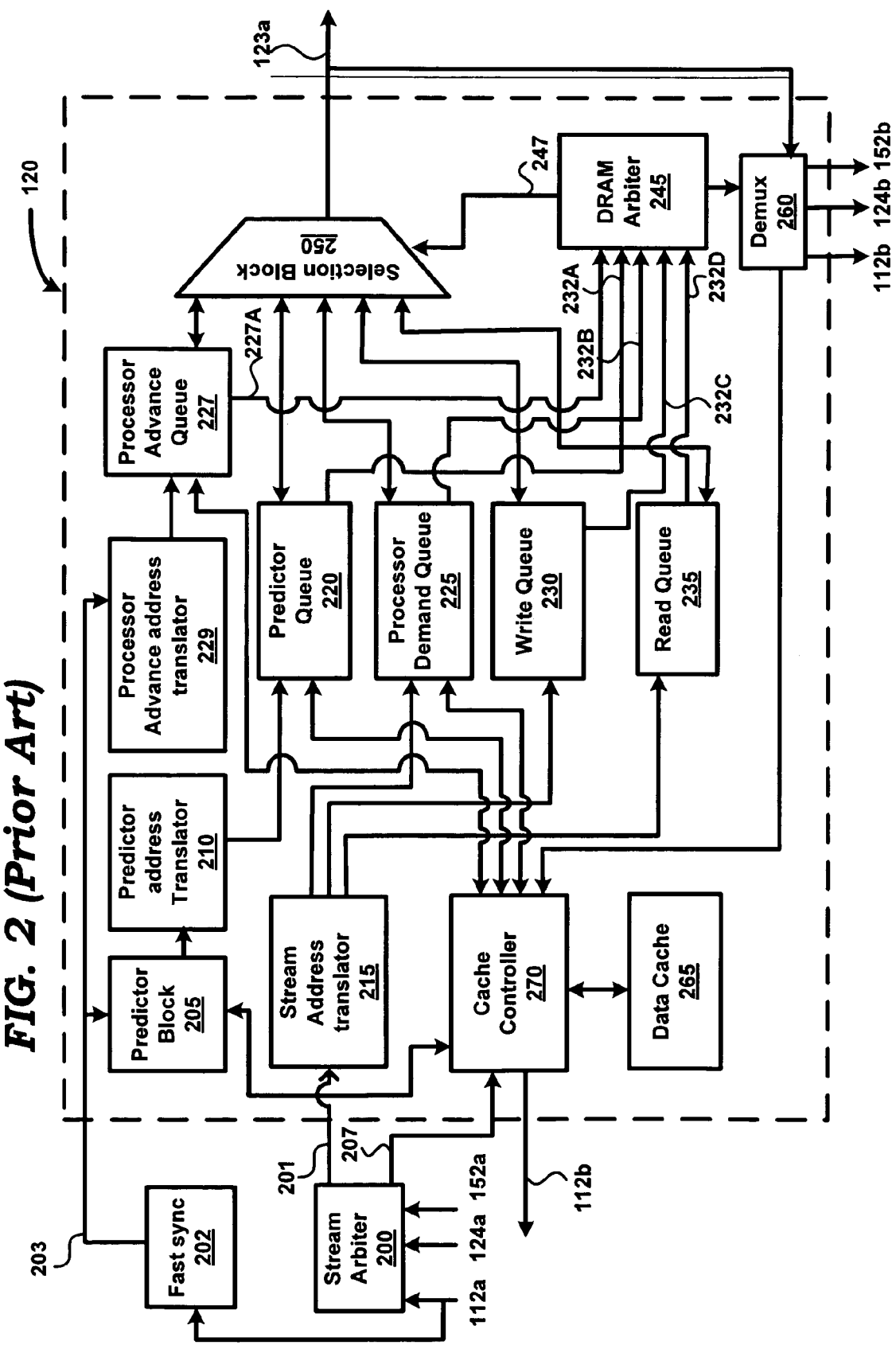
FIG. 2 is a block diagram illustrating the details of a prior memory controller in an embodiment.

FIG. 2 illustrates the details of a bridge as relevant to data retrieval/access in a prior approach. The prior embodiment is described in the context of FIG. 1 merely for illustration. Furthermore, in both FIGS. 2 and 3, only the details of the bridge as relevant to memory accesses are included and also each of bidirectional paths 112, 123, 124 and 152 is shown being logically split into two uni-directional paths suffixed with a and b for ease of representation.

The prior bridge is shown containing blocks that are part of the memory controller (shown within the dotted box) and also blocks that may be viewed as being outside of the memory controller. Thus, the memory controller is shown containing predictor block 205, predictor address translator 210, stream address translator 215, processor advance address translator 229, predictor queue 220, processor demand queue 225, processor advance queue 227, write queue 230, read queue 235, DRAM arbiter 245, selection block 250, demux 260, data cache 265, cache controller 270. Stream arbiter 200 and fast sync 202 are viewed as being external to the memory controller.

Path 112a is used to receive access requests from CPU 110 along with the memory address of the location/position of data (in memory unit 130). Similarly path 124a is used to receive read/write requests with the corresponding memory addresses from one or more of the peripheral devices such as 160A-160N and path 152a is used to receive requests with the corresponding memory addresses from GPU 150.

Stream arbiter 200 receives requests (read or write) from the paths 112a, 124a and 152a and forwards each request to the appropriate next component/block. All requests from stream arbiter 200 are forwarded sequentially to stream address translator 215 (after arbitration) on path 201 and CPU read requests are in addition forwarded to cache controller 270 via path 207.

Fast sync 229 receives read requests from path 112a and forwards it to predictor block 205 and processor advance address translator 229. Fast sync 202 may synchronize the received requests (before forwarding it) as there may be a difference in operating speed between the bus 112 and the memory controller. It may be noted that all the CPU read requests received via path 112a are sent to the predictor block 205 for predictions and to processor advanced address translator 229 irrespective of when the request is being forwarded by stream arbiter 200 to the memory controller (as a part of arbitration/sequencing).

Processor advance translator 229 translates the memory address (corresponding to the received read request) received via path 203 to a format compatible with the implementation of memory unit 130 and forwards it to processor advance queue 227. It may be noted that processor advance address translator 229 is useful in forwarding the CPU read requests to DRAM 245 immediately upon receipt especially in a scenario when stream arbiter 200 delays forwarding the read request from CPU (while sequencing the requests).

Data cache 265 stores the previously retrieved data elements along with corresponding memory addresses. The entries (data element and address combination) may be removed after some corresponding duration of storage according to one of various approaches (e.g., when not used for a certain number of retrievals or on a FIFO basis) well known in the relevant arts.

Cache controller 270 searches the content of data cache for the data element(s) corresponding to the memory address(es) in each read request received on path 207. If the data element is present in data cache 265 the corresponding response (containing the requested data elements) may be generated based on the content of data cache 265 and sent on path 112b (corresponding to one of the logically split unidirectional path of 112) to CPU 110.

If the CPU requested data elements are not present in data cache 265, the read request is forwarded to DRAM arbiter 245 either through processor demand queue or processor advance queue as explained below. It may thus be noted that when a first read request is received from CPU 110 (meaning there are no data elements in data cache 265) the request is directly sent to DRAM arbiter 245 through 227.

Predictor block 205 predicts (or speculates) some future requests that may be received from CPU 110 based on previously received requests (via path 203). In general, each prediction causes a read request with corresponding predicted address to be formed. In one prior approach, predictor block 205 uses an algorithm to compute n+1, n+2, n+3, etc. as the addresses in the future requests, wherein n is the memory address in a read request received from CPU 110. In the alternative or addition, the approach further uses logic such as n−1, n−2, n−3, etc., also as the predicted addresses.

Predictor block 205 may probe cache controller 270 to determine whether the response/data of the predicted request is already present in data cache 265. Predictor block 205 sends the predicted memory addresses to predictor address translator 210 only if predicted memory addresses are not present in the data cache 265 (by comparing the predicted addresses with the memory addresses of the data elements present in the data cache using cache controller 270).

Predictor address translator 210 buffers the memory addresses received from predictor block 205 and translates these addresses into RCB addresses or any other type/format depending upon the addressing mechanism implemented within memory unit 130 and forwards the translated address to predictor queue 220.

Stream address translator 215 converts each address from stream arbiter 200 on path 201 into a format compatible with the implementation of memory unit 130. The received request may be originating from CPU, GPU 150 or peripherals 160A-160N. For example assuming that each address received from requesters is in a linear space and that memory unit 130 is implemented as a DIMM (thereby requiring the addresses to be provided in RCB format), each linear address is converted into RCB format. Predicted and processor advanced requests have dedicated address translators 210 and 229 respectively, as shown and translate addresses similar to stream address translator.

As an illustration, it is simplistically assumed that a 36 bit linear address is received from the requesters, and that a memory unit 130 has a 10 bit column address, 13 bit row address and 3 bit bank address (implying there are 8 DRAMs in each bank), and that each column addressing a byte a column address is 8 byte aligned.

Now assuming that the 36 bit linear address equals h000f0f000 in hex format, the column address (10 bits) may equal 200, bank address (3 bits) 111, and row address (13 bits) of 00f0. In general, linear_address[12:3]=column_address, linear_address[15:13]=bank_address and linear_address[28:16]=row_address.

After the translation, address translator 215 places the translated address in the corresponding queue (such as Processor Demand queue, Write Queue, Read Queue) depending up on from where (such as 110, 160A, 160B) the requests originated and the type (read or write) of request, etc., as described below. Predicted addresses from the predictor address translator 210 (after translation) are placed in the predictor queue 220. Processor advance translator 229 translates the CPU read request received via path 203 and places the translated address in the processor advance queue 227.

Queues 220, 225, 227, 230 and 235 respectively buffer the access requests originating due to predicted addresses, read requests from CPU 110 received from stream address translator, read requests from CPU 110 received from processor advance address translator, write requests from all blocks, and read requests from blocks other than the CPU, until dispatched to memory unit 130 via path 123a. It should be noted that each queue may store the translated address (which is needed for the access requests) and corresponding linear address (at least in case of all the read requests which are to be cached in data cache 265 after retrieval of the data element).

Furthermore each of queues 220,225 and 227 probes cache controller 270 to check whether a response corresponding to a queued entry is already present in cache 265. In a scenario when the requested memory addresses are already present in the data cache then the request is removed from the respective queues (220, 225 or 227). As a result, the same read requests present in both queues 227 and 225 may not be forwarded twice to memory unit 130 via path 123a.

It is assumed that each queue is implemented as a FIFO (first in first out) queue such that, within a given queue, the first entering access request is available for dispatch next. However, alternative approaches can be used depending on the requirements of the specific sources. Further, each queue is implemented with corresponding hardware support (e.g., physical memory, registers, etc.).

DRAM arbiter 245 determines the specific queue from which an access request can be dispatched on path 123a, and causes the waiting request from that queue to be dispatched. In an embodiment, arbiter 245 receives request for grants from the queues 220, 225, 227, 230 and 235 as shown by the paths 232A, 232B, 227A, 232C, and 232D respectively when there is a request waiting in the corresponding queues. Path 247 is sent a select value corresponding to the selected queue.

DRAM arbiter 245 uses approaches such as a weighted round robin algorithm for granting access to one of the queue. Round robin implies that the turns are rotated among the queue, while the respective "weight" determines how many more (or fewer) requests are allowed grants from the particular queue, compared to the other queues on the list.

Thus, assuming that it is desirable to serve the requests from CPU 110 more, queue 225 and 227 may be assigned more weight compared to other queues. Accordingly requests from the CPU 110 in processor demand queue 225 or processor advance queue 227 are granted access to the path 123a by the arbiter more times than that of the requests from the other queues (such as Write Queue 230).

In one prior implementation, in each access cycle, a combined weight is given to the combination of predictor queue 220, processor demand queue 225 and processor advance queue 227. Thus, three groups are deemed to be present in the weighted round robin allocation, with the first group having queues 220, 225 and 227, the second group having queue 230 and the third group having queue 235. Each group is provided a turn consistent with the weight assigned to the group. The first group is assigned more turns based on a larger weight assigned to the group.

Within the first group, arbiter 245 implements a fixed priority, with queues 225, 227 and 220 being provided a correspondingly lower priority in that order. Thus, arbiter 245 provides grant to the processor advance queue and predictor queue only when there are no requests pending in processor demand queue 225. Similarly, queue 227 is provided a turn when there are no requests pending in queue 225.

Thus, it may be observed that requests from predictor queue 220 may be sent when there may be actual requests waiting in other queues such as 230 and 235 thereby delaying the serving of actual requests from the peripherals (such as 160A-160N) and GPU 150. It may also be noted that this might happen more often as the "weight" given to the CPU is often more (to ensure the read requests from CPU are served fast) than that of the peripherals and GPU.

Selection block 250 selects the next pending access request from the specific one of queues 220/225/230/235/227 according to the specific selection value received on path 247, and sends the selected request to memory unit 130 on path 123a. Selection block 250 may cause the transmitted request to be removed from the corresponding queue.

Demux 260 receives selection data indicating which of the queues 220/225/230/227 and 235 has been granted access to bus 123a in each access cycle and uses the selection data to channel the retrieved data in case of read request to the corresponding destinations. For example, if a received data element is in response to a request from predictor queue 220, the data element is stored in data cache along with the corresponding memory addresses as received from demux 260.

If a received data element is in response to a request from processor demand queue 225 or processor advance queue 227, the data element is stored in data cache 265 and sent on path 112b (corresponding to one of the logically split uni-directional path of 112) to CPU 110. If a received data element is in response to a request from one of peripherals, the data element is sent on path 124b (corresponding to one of the logically split uni-directional path of 124). If a received data element is in response to a request from GPU 150, the data element is sent on path 152b (corresponding to one of the logically split uni-directional path of 152)

It may be appreciated that data retrieved from memory unit 130 is one full cache line (based on the memory address received) even if the CPU request specifies the size of the data (which may be less than one cache line). Similarly the data sent (each transmission) via path 112b will be half a cache line per interface clock. As many interface clocks as required to send the requested data are used. It may also be noted that one cache line is generally 64 bytes.

Demux 260 further provides the linear address along with the retrieved data element to cache controller 270, in case of read requests (either predicted or from the CPU). The linear address is received from the respective queue 220/225/227 via DRAM arbiter 245.

It may be observed that the approach of FIG. 2 has several drawbacks. For example, as noted above, processing of the actual requests received from the peripherals and GPU may be delayed due to the predicted requests, even if the predicted requests may not be useful later.

In addition, predictions performed prior to translation may cause further latency in processing the read requests.

Several aspects of present invention overcome at least some of the limitations described above. While the features of the invention are described with respect to addressing the limitations of FIG. 2, it should be appreciated that the invention can be implemented in various alternative embodiments, as will be apparent to one skilled in the relevant arts by reading the disclosure provided herein.

Novel Memory Controller

Figure 3:
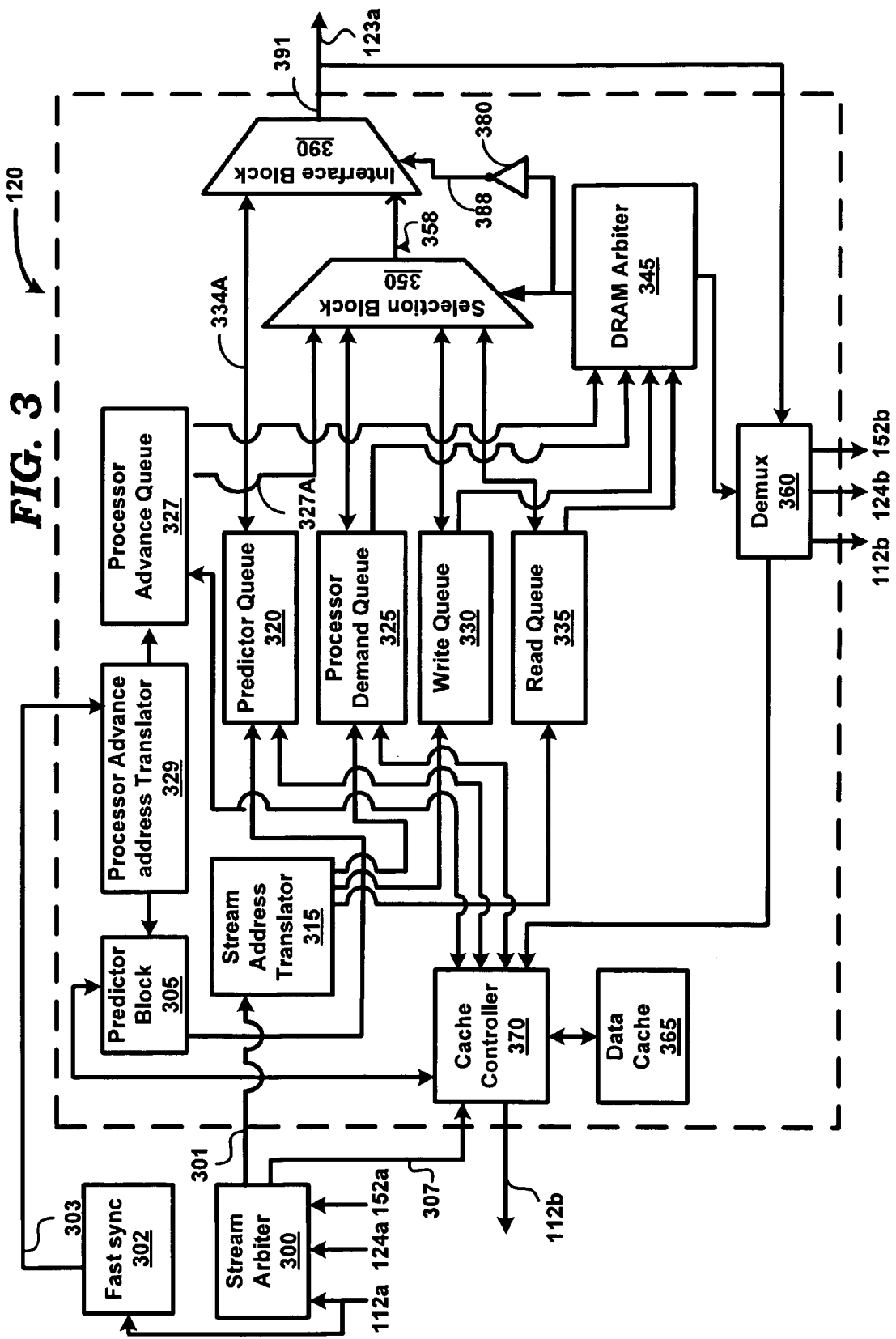
FIG. 3 is block diagram illustrating the details of a memory controller in an embodiment of the present invention.

FIG. 3 illustrates the details of a memory controller provided according to an aspect of the present invention. As the memory controller is contained in bridge 120, the portions external to the memory controller are shown outside of the dotted line, as in FIG. 2. In addition, components of FIG. 3 with similar/same name as in FIG. 2 perform similar/same function/operation as described above, and the differences are described below for conciseness. Thus, stream arbiter 300, data cache 365, cache controller 370, and demux 360 may operate similar to stream arbiter 200, data cache 265, cache controller 270 and demux 260 and the description is not repeated substantially for conciseness.

Fast sync 302 forwards the read requests from CPU 110 (received via path 112a) to processor advance address translator 329 (via path 303) instead of forwarding it to both predictor block and processor advance address translator as shown above in the prior approach.

Processor advance address translator 329 translates each memory address received via path 303 to a format consistent with the implementation of memory unit 130. Thus, the addresses may be translated into RCB format in case of DIMM memories, as described above with an example. Processor advance translator 329 after translation (of received addresses) forwards the translated addresses to predictor block 305 (for predictions) and to the processor advance queue 327 for buffering (for later processing). Thus predictions are performed on the translated addresses as per the new approach.

Stream address translator 315 translates each received address (from stream arbiter), and each translated access/read request is stored in corresponding one of queues 325, 330 and 335 (which operate respectively similar to 225, 230 and 235) depending on the request being processed and from where the request originated.

Predictor block 305 predicts (or speculates) read requests that may be received from CPU 110 in future based on the translated address. The predicted requests thus formed are sent to predictor queue 320. The prediction can again be implemented using various approaches as will be apparent to one skilled in the relevant arts.

In one embodiment, the address corresponding to the predicted read request is determined by adding 1 to the column part of the Row Column Bank (RCB) translated address. When the increment exceeds the number of rows available (implying that the next address corresponds to a next bank), the predicted address is ignored and thus not sent to predictor queue 320.

For example, for a 36 bit linear address of 36'h000f0f000 described above with respect to Prior Art embodiments, predictor block 305 may add 1 to the column address and form a value of 201 for the column address, while keeping the row address and bank address to be the same.

Due to the simplicity of the prediction approach, the prediction can be performed quickly, thereby potentially facilitating the performance of prediction and translation in a single clock cycle.

Predictor block 305 may further support providing of the linear addresses to data cache 365. In an embodiment, predictor block 305 generates the linear address corresponding to the predicted RCB address (e.g., by adding 1 to the received linear address) and provides the linear address along with the predicted address (for the predicted read requests) to predictor queue 320.

As described below, the various blocks operate to provide access requests from processors and peripherals according to the respective assigned weights or priorities, while sending the predicted requests only if no other requests are available in the respective queues.

DRAM arbiter 345 receives request for grants from queues 325, 327, 330 and 335 when there is a request waiting in the corresponding queues, and provides a grant to one of the requesting queues. It should be appreciated that receiving the grant requests represents an example approach to examining the status of the queues, though other techniques can be employed to check the status of the queues.

The specific queue to which a grant is provided can be based on various approaches. For example, a fixed priority based approach can be used, where a queue with a lower priority is provided a grant only if there are no waiting entries in a higher priority queue. In an alternative embodiment, arbiter 345 uses a weighted round robin approach (described above with respect to prior art embodiments) in determining the queue to which the grant is to be provided. For the weighted round robin purpose, the first group includes queues 325 and 327, the second group contains queue 330, and the third queue contains queue 335. Within the first group, queue 325 is given a higher priority over queue 327, as also described with respect to the prior approach above. It should be noted that predictor queue 320 is not considered in the weighted round robin approach.

Selection block 350 receives an identifier of the selected queue from arbiter and selects the access request from the corresponding selected queue. The selected access request is provided on path 358 to the interface block 390. Inverter 380 generates on path 388 one logic level (e.g., 0) when arbiter 345 has not selected any of the queues (to provide grant) and another logic level otherwise.

Interface block 390 selects the access request from either path 358 or path 334A depending on the value on path 388. The selected access request is sent to memory unit 130 on path 391/123a. At least to the extent of selection, the interface block and the inverter may be viewed as being part of arbiter 345.

Thus, the predicted requests are sent only when no requests are present from any of the processors or peripherals, thereby reducing the delays in processing requests from at least the peripherals. Furthermore, due to the simplicity of prediction approach, time critical path may be avoided in pre-fetching data elements.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of controlling accesses to a memory unit, said method operable to be performed in a memory controller, said method comprising:

receiving a first set of read requests from a processor unit and a first plurality of requests from a plurality of peripheral devices;

forming a set of predicted requests based on said first set of read requests;

queuing said first set of read requests in a first queue and said first plurality of requests in a second queue;

selecting one of said set of predicted requests, said first set of read requests and said first plurality of requests as a selected request; and sending said selected request to said memory unit in an access cycle, wherein one of said set of predicted requests is selected as said selected request only if there are no requests in said first queue and said second queue in said access cycle.

2. The method of claim 1, further wherein said queuing stores said set of predicted requests in a third queue, wherein said selecting comprises checking a status of said first queue and said second queue for absence of pending requests in said first queue and said second queue.

3. The method of claim 1, wherein each of said first set of read requests is received in a first address space and data in said memory unit is stored according to a second address space, said method further comprising:

translating an address of each of said first set of read requests from said first address space to said second address space, wherein said forming is performed in said second address space after performing said translating.

4. The method of claim 3, wherein said second address space comprises a column identifier, a row identifier, and a bank identifier for each address, wherein said forming comprises incrementing the column identifier of the translated addresses of the first set of read requests to produce an incremented column identifier; and wherein said forming ignores a corresponding predicted request if the incremented column identifier is more than a number of columns present in a corresponding bank.

5. The method of claim 3, further comprising:

storing in a cache the data units received in response to sending said set of predicted requests;

examining said cache in response to receiving each of said first set of read requests; and if a data unit is present for a request, sending a response to said processor unit based on the data units stored in said cache.

6. The method of claim 3, wherein said first address space is a linear address space, and said second address space is a row-column bank space.

7. A memory controller operable to process read requests from a processor, said read requests being directed to a memory unit, said memory controller comprising:

an address translator operable to receive a first set of read requests in a first address space from said processor, wherein said address translator is operable to translate an address of each of said first set of read requests from said first address space to a second address space of said memory unit;

a predictor block operable to examine said first set of read requests in said second address space and operable to form a set of predicted requests based on said first set of read requests in said second address space; and an interface block operable to send said first set of read requests and said set of predicted requests in said second address space to said memory unit.

8. The memory controller of claim 7, further comprises:

a first queue operable to store said first set of read requests with addresses in said second space;

a second queue operable to store said set of predicted requests;

a third queue operable to store a second set of requests from a plurality of peripherals; and an arbiter operable to select a pending request in one of said first queue, said second queue and said third queue in an access cycle, wherein said arbiter is operable to select the pending request from said second queue only if there are no requests in said first queue and said third queue in said access cycle.

9. The memory controller of claim 8, wherein said second address space comprises a plurality of column identifiers and a plurality of row identifiers, wherein said predictor block is operable to increment said plurality of column identifier of the said second address space to form said set of predicted requests.

10. The memory controller of claim 9, wherein said first address space is a linear address space, and said second address space is a row-column bank space.

11. The memory controller of claim 9, wherein said predictor block ignores the corresponding predicted request if the incremented column identifier is more than a number of columns present in the corresponding bank.

12. The memory controller of claim 11, wherein said predictor block generates a linear address for said corresponding predicted request and stores said linear address of the corresponding predicted request also in said second queue.

13. The memory controller of claim 9, wherein said arbiter is operable to use a weighted round robin approach in selecting one of said first queue and said third queue, said memory controller further comprises:

a first selection block operable to receive an identifier from said arbiter, said identifier identifying the selected one of said first queue and said third queue, and operable to forward on a first path a first pending request from the queue identified by said identifier;

said interface block operable to select a request received on said first path or a first pending request in said second queue, and wherein said interface block selecting said first pending request in said second queue when said identifier indicates that neither of said first queue and said second queue is selected by said arbiter, and wherein said interface block sending the selected request to said memory unit.

14. A system comprising:

a memory unit operable to store a plurality of data elements according to a second address space;

a processor operable to generate a first set of read requests directed to said memory unit according to a first address space;

a memory controller operable to control access to said memory unit, said memory controller comprising:

an address translator operable to receive said first set of read requests in said first address space, wherein said address translator is operable to translate an address of each of said first set of read requests from said first address space to said second address space;

a predictor block operable to examine said first set of read requests in said second address space and operable to form a set of predicted requests based on said first set of read requests in said second address space; and an interface block operable to send said first set of read requests and said set of predicted requests in said second address space to said memory unit.

15. The system of claim 14, further comprising a component operable to generate a second plurality of read requests also directed to said memory unit, wherein said memory controller further comprises:

a first queue operable to store said first set of read requests with addresses in said second space;

a second queue operable to store said set of predicted requests;

a third queue operable to store said second set of read requests; and an arbiter operable to select a pending read request in one of said first queue, said second queue and said third queue in an access cycle, wherein said arbiter is operable to select the pending request from said second queue only if there are no requests in said first queue and said third queue in said access cycle.

16. The system of claim 15, wherein said component is a peripheral, said system further comprising:

a first bus coupling said processor to said memory controller;

a peripheral controller operable to interface with said peripheral; and a second bus coupling said peripheral controller to said memory controller.

17. The system of claim 16, wherein said memory unit is implemented as a duel in-line memory modules (DIMM), and wherein said first address space is a linear address space and said second address space is a row-column bank space, and wherein said second address space comprises a plurality of column identifiers and a plurality of row identifiers corresponding to columns and rows contained in said DIMM, and wherein said predictor block is operable to increment said plurality of column identifier of the said second address space to form said set of predicted requests.

18. The system of claim 17, wherein said predictor block ignores a corresponding predicted request if the incremented column identifier is more than a number of columns present in the corresponding bank.

19. The system of claim 18, wherein said arbiter is operable to use a weighted round robin approach in selecting one of said first queue and said third queue, said memory controller further comprises:

a first selection block operable to receive an identifier from said arbiter, said identifier identifying a selected one of said first queue and said third queue, and operable to forward on a first path a first pending request from the queue identified by said identifier;

said interface block operable to select a request received on said first path or a first pending request in said second queue, and wherein said interface block selecting said first pending request in said second queue when said identifier indicates that neither of said first queue and said second queue is selected by said arbiter, and wherein said interface block sending the selected request to said memory unit.

20. The system of claim 19, wherein said first queue is operable to store requests received on said first bus only and said second queue is operable to receive requests received on said second bus only.

21. The system of claim 19, wherein said address translator is operable to translate said address of each of the first set of read requests to said second address space prior to said predictor block forming said set of predicted request based on the first set of read requests in said second address space.

* * * * *